July 7, 1970  R. T. BROWN, JR., ET AL  3,519,354
SYSTEM FOR MEASURING EXTINCTION COEFFICIENTS IN THE ATMOSPHERE
UTILIZING BACKSCATTERED SIGNALS
Filed June 17, 1965  4 Sheets-Sheet 1

INVENTORS
RICHARD T. BROWN JR.
RICHARD F. HAZEL
HERBERT LAUDON
BY

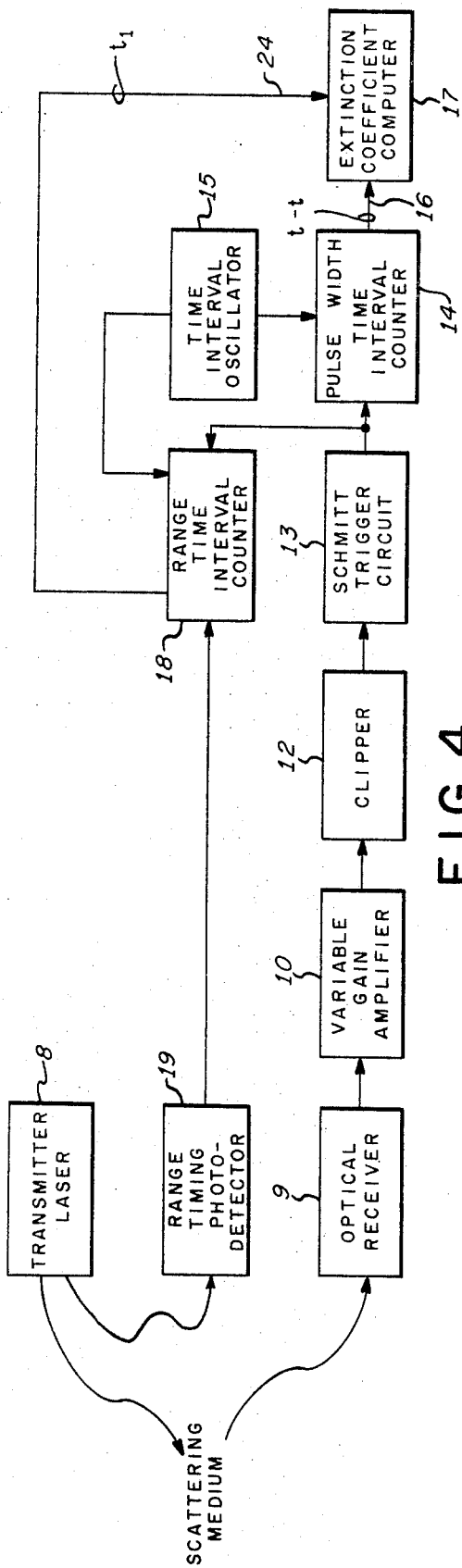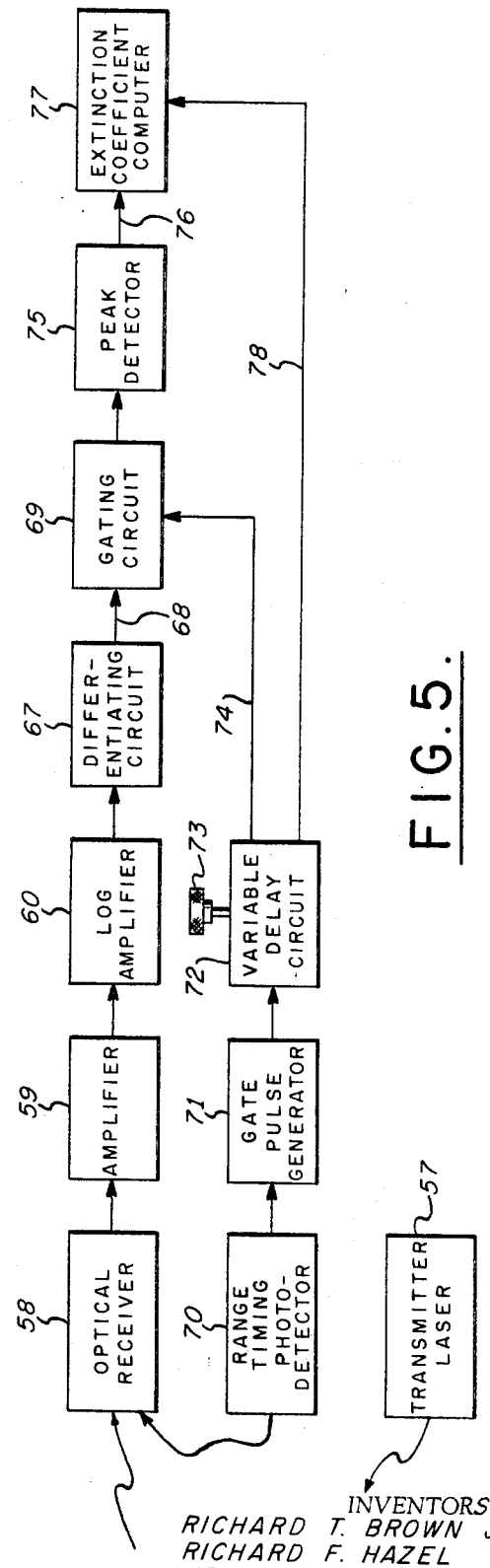

July 7, 1970

R. T. BROWN, JR., ET AL 3,519,354

SYSTEM FOR MEASURING EXTINCTION COEFFICIENTS IN THE ATMOSPHERE UTILIZING BACKSCATTERED SIGNALS

Filed June 17, 1965

INVENTORS
RICHARD T. BROWN JR.
RICHARD F. HAZEL
HERBERT LAUDON
BY
Robert J. Haase
ATTORNEY

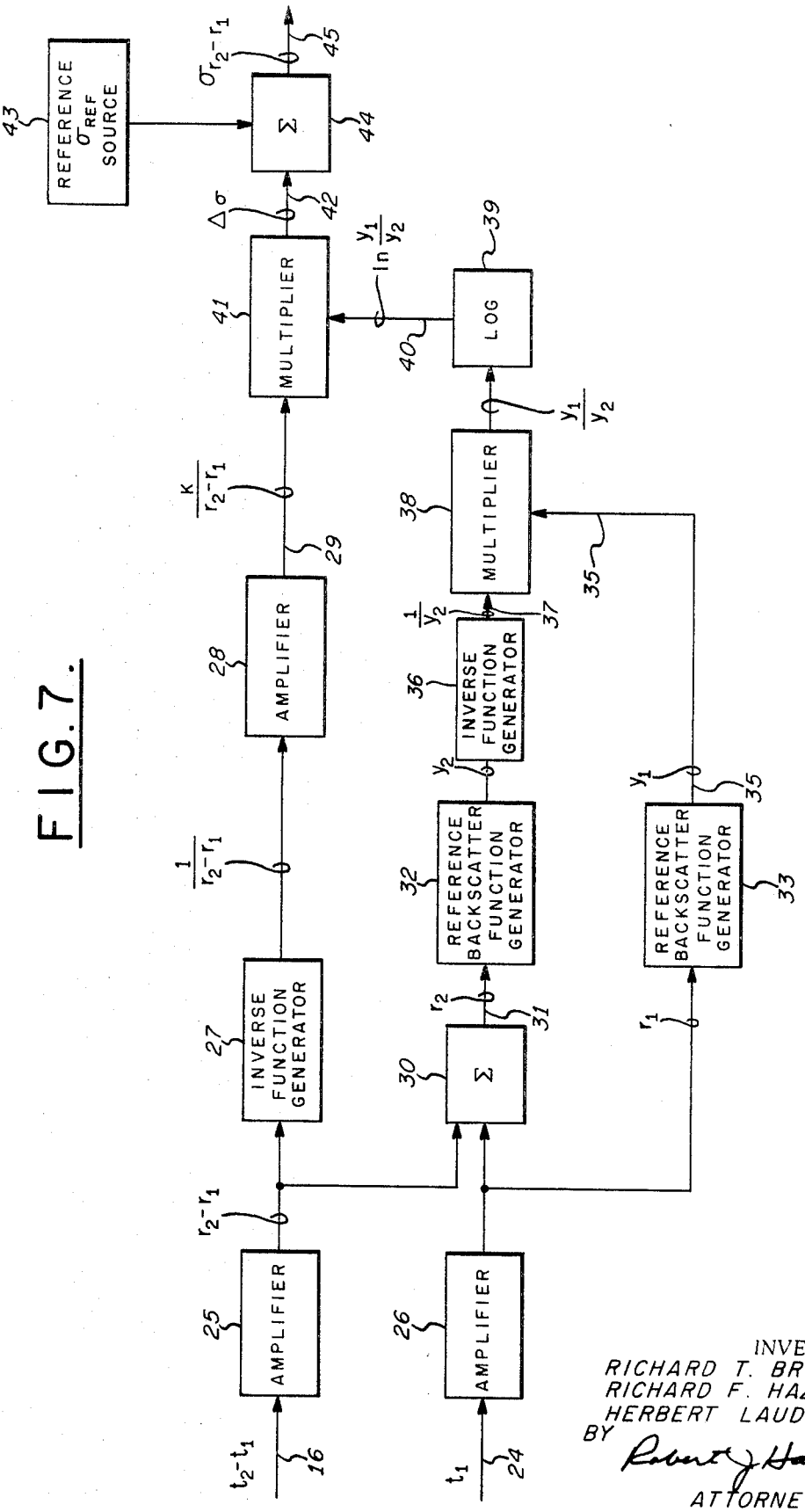

United States Patent Office 3,519,354
Patented July 7, 1970

3,519,354
**SYSTEM FOR MEASURING EXTINCTION COEF-
FICIENTS IN THE ATMOSPHERE UTILIZING
BACKSCATTERED SIGNALS**
Richard T. Brown, Jr., Bolton, and Richard F. Hazel,
Marlboro, Mass., and Herbert Laudon, Forest Hills,
N.Y., assignors to Sperry Rand Corporation, Great
Neck, N.Y., a corporation of Delaware
Filed June 17, 1965, Ser. No. 464,603
Int. Cl. G01n 21/22
U.S. Cl. 356—103            10 Claims

ABSTRACT OF THE DISCLOSURE

A pulsed laser irradiates the atmosphere with a divergent beam of light. An optical receiver having a divergent field of view is spaced transversely of said beam so that said field of view overlaps the full length of said beam beginning at a predetermined distance from the laser. The backscattered pulsed energy detected by the receiver is analyzed as to time-to-peak, width of peak and slope to compute atmospheric extinction coefficient data.

---

The present invention generally relates to systems for measuring meteorological visual range under atmospheric conditions which restrict the visibility and transmission of optical and infrared radiations. More particularly, the invention is concerned with a system wherein visual range is measured in terms of extinction coefficient which is determined from certain characteristics of a backscattered pulsed optical signal.

Meteorological visual range measurements are of prime importance at airports, missile launching sites, air pollution monitoring and control centers, and other locations where optical or infrared radiation is transmitted or received. Airport facilities having all-weather landing capabilities especially require equipment which accurately and representatively measures horizontal and slant visual range encountered by pilots during taxiing, taking off and landing. Visual range currently is measured by various instruments as well as by the human eye. The instruments, however, generally are designed for use over accessible terrain inasmuch as they require a two-ended measuring system, i.e., a system wherein radiation source and receiver are situated at opposite ends of the optical path.

The distance separating the radiation source from the receiver must be fixed in accordance with the visual range occurring under the worst weather conditions when visibility is the poorest. The lower the visibility, the smaller the distance that light energy can penetrate the atmosphere. Consequently, it has become necessary to reduce the distance separating the transmitter and receiver to a very short base line of the order of about 500 feet along airport runways. In order to measure the visibility over the entire length of a 10,000 foot runway, for example, 20 complete transmitter-receiver packages are required at 500 foot intervals. Adequate coverage is imperative because it is entirely possible for one end of a runway to be virtually clear with good visibility while the other end of the runway is completely obscured by patchy fog. Another shortcoming of prior art two-ended visibility measuring systems is that they are suitable for making measurements along horizontal optical paths but not along slant paths such as the guide path of an aircraft during landing. Hazardous obstructions such as an optical transmitter or receiver, of course, cannot be placed along the glide path.

Single-ended systems, wherein the optical transmitter and receiver are at substantially the same location, have been proposed to overcome the aforementioned disadvantages inherent in the two-ended systems. However, existing single-ended systems are designed to respond to the amplitude of the optical signal returned to the receiver. The amplitude of the received signal varies from one type of weather condition to another in accordance with the number, type, and size of the weather particles. Thus, the amplitude of the received signal cannot be used by itself to determine visibility with accuracy. Prior art single-ended systems also require that the equipment be located within a homogeneous volume of atmosphere whose visibility is to be determined; discontinuities or changes in the visibility within the volume are not ascertained.

One object of the present invention is to provide a visibility measuring system which determines atmospheric extinction coefficient over a slant path or horizontal path of flexible length.

Another object is to provide a visibility measuring system which delineates the variations in atmospheric extinction coefficient along a path.

A further object is to provide a visibility measuring system having an effective base line whose length varies automatically with the severity of weather obstructions.

An additional object is to provide a visibility measuring system which is insensitive to the number, type and size of weather particles.

These and other objects of the present invention, as will appear from a reading of the following specification, are achieved through the use of a pulsed laser transmitter and an optical receiver for detecting the portion of each transmitted pulse of light which is backscattered from the atmosphere. The transmitter and receiver are spaced from each other but are mounted on the same base member which may be pivoted, if desired, for measurements along different horizontal and/or different slant optical paths. Sensitivity to the number, type and size of weather particles is avoided by utilizing characteristics of the backscattered light other than the intensity characteristic. More particularly, each of the following three alternative characteristics of the received backscattered light is utilized in respective embodiments of the invention:

(1) The time of the amplitude peak of the received light relative to the time of transmission.

(2) The duration of the peak amplitude of the received light measured at the one-half peak amplitude point.

(3) The slope or rate of decay of the backscattered energy.

It can be shown that each of the aforementioned three backscattered signal parameters is a measure of the extinction coefficient of the atmosphere into which the transmitted light pulse is directed and from which the backscattered pulse is received. Extinction coefficient, when used in conjunction with a typical human eye parameter such as contrast ratio threshold, yields a reliable measure of visibility in accordance with the expression (Koschmieder's theory)

$$V_m = \frac{1}{\sigma}\left[\ln\frac{C_o}{\epsilon} - \ln\frac{B_o}{B_r}\right]$$

where $V_m$ is visual range, $\sigma$ is the extinction coefficient for the visibility-reducing medium, $C_o$ is the inherent contrast of an object being viewed, $B_o$ and $B_r$ are the brightness (luminance) of the background as viewed from the object and from a range $r$, respectively, and $\epsilon$ is the contrast ratio threshold for a "normal" human eye.

The above expression is valid under daylight conditions. At night, when artificial light is encountered, the following expression is applicable (Allard's Law)

$$E_t = \frac{I_o e^{-\sigma V_m}}{V_m^2}$$

where $E_t$ is the minimum illuminance which a normal eye can detect, $I_o$ is the intensity of the light source, $V_m$ is the visual range, and $\sigma$ is the extinction coefficient.

In accordance with the present invention, a data signal is produced representing any desired one of the aforementioned three parameters of the received backscattered signal and the data signal is applied to a computer which calculates the corresponding atmospheric extinction coefficient.

For a more complete understanding of the present invention, reference should be had to the following specification and to the appended figures of which:

FIG. 4 is a simplified block diagram of the receiver for the pulse duration species of the present invention;

FIG. 5 is a simplified block diagram of the receiver for the pulse slope species of the present invention;

FIG. 7 is a simplified block diagram of a computer adapted for operation with the receiver of FIG. 4 to determine atmospheric extinction coefficient.

Figure 1:
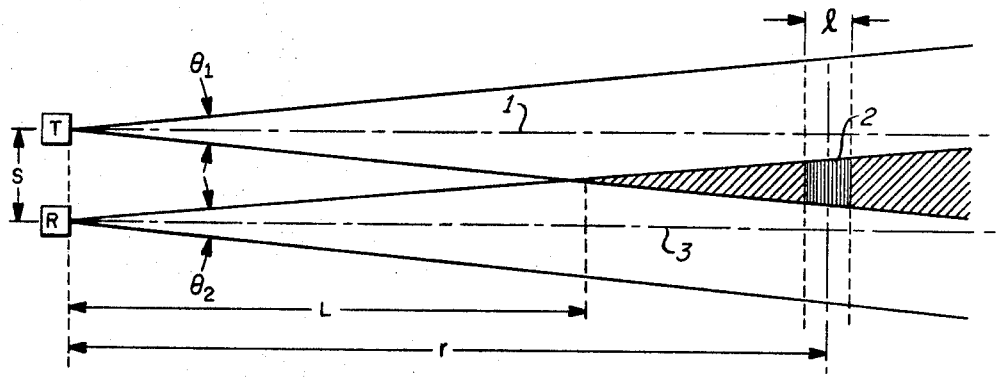
FIG. 1 is a sketch of the optical path geometry pertinent to the operation of the invention.

FIG. 1 is a plan view of the system geometry of interest to the present invention. A beam of pulsed light emanates from laser transmitter T, propagates along path 1, and diverges at the angle $\theta_1$. An optical receiver R is positioned adjacent transmitter T and spaced from it by small distance S. The angular extent of the field of view of the optical receiver is designated $\theta_2$. The axis 3 of the receiver field of view is approximately parallel to the direction of transmitted beam axis 1 so that at some predetermined distance L the emitted pulse beam and the angular field observed by receiver R begin to overlap. It is to be noted that the distance L is a function of the spacing S, the transmitter and receiver beam angles $\theta_1$ and $\theta_2$, respectively, and the angle between the axes of the transmitter and receiver beams. Thus, the distance L can be varied readily in order to meet the requirements of a specific installation and/or weather condition by adjusting the values of the named parameters. For example, where the detection of critical visibility conditions along a 10,000 foot airport runway is desired, one suitable set of values of the parameters are: $S = 10$ feet, $\theta_1$ and $\theta_2$ each being approximately $\frac{1}{4}°$ and the axes of the transmitter and receiver beams being substantially parallel to each other. The overlap region assumes the spacial proportions of the shaded area 2 at the range $r$ for a pulse of equivalent length $l$. As the pulse $l$ travels away from the transmitter T, each increment of the scattering medium scatters some of the light flux, a portion of this being backscattered. Consequently, there is a continuous flux of backscattered light while the transmitted pulse continues its outward travel. Like the transmitted flux, the backscattered flux is diminished in passing through the medium (atmosphere) on its return to receiver R. Some time after each pulse is emitted from transmitter T, there will no longer be any detectable backscatter reaching receiver R.

Figure 2:
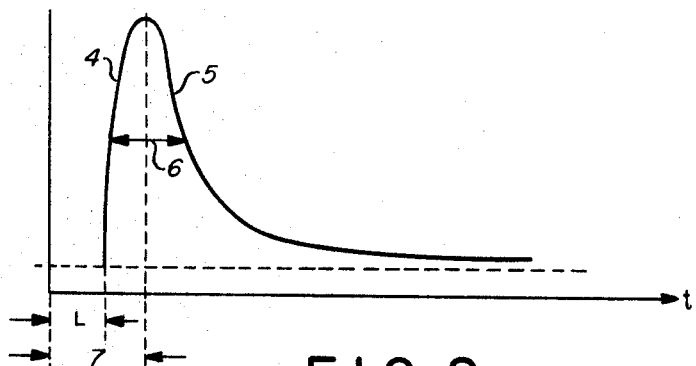
FIG. 2 is an amplitude versus time plot of a typical backscattered signal developed in the receiver of any of the species of the present invention.

FIG. 2 represents an amplitude versus time plot of the backscatter detected by receiver R. Quantitatively, the plot has the form $$y = y_0 \frac{A(r)}{r^4} \text{Exp} \left[ -2 \int_0^r \sigma(r) dr \right] \quad (1)$$

where $y$ is the backscattered flux received at one instant of time, $y_0$ is a constant which reflects the geometry, the physical characteristics of the scattering medium, and the flux contained in the emitted pulse. $A(r)$ is the effective cross-sectional area of the pulse $l$ at the range $r$, and $\sigma$ is the scattering extinction coefficient. The characteristic rise and fall depicted in the plot of FIG. 2 results from the opposing effects of the increase in the scattering volume beyond point L and the diminution of the flux in the detected pulse due to the scattering. The initial increase of backscattered flux depicted by the rising portion 4 of the plot (due to the increase in the scattering volume) is rapidly overcome and then exceeded by the decrease of backscattered flux represented by the falling portion 5 (due to scattering attenuation).

As previously mentioned, it is preferred to determine the extinction coefficient of the scattering medium through the use of some parameter of the detected backscattered signal which is not dependent on the size, number or composition of the scattering particles in the medium. The preferred technique automatically eliminates the direct use of expression (1) inasmuch as the factor $y_0$ reflects the physical characteristics of the scattering medium. In accordance with respective embodiments of the present invention, the characteristics of the detected backscattered signal which are utilized in determining the extinction coefficient of the scattering medium are (1) the width 6 of the peak of the backscattered signal measured at the one-half peak amplitude point, (2) the slope of the falling portion 5 and (3) the time of occurrence 7 of the peak of the backscattered pulse relative to the occurrence of the transmitted pulse. The structure represented in the simplified block diagram of FIG. 4 determines the width of the backscattered signal measured at the one-half peak amplitude point and then computes the extinction coefficient of the scattering medium utilizing the determined width.

Referring to FIG. 4, transmitter laser 8 produces a short pulse of coherent optical energy for irradiating the scattering medium whose extinction coefficient is to be determined. In a typical instance, laser 8 may be a pulsed ruby laser operating at approximately 6943 angstroms and emitting a short pulse of about 20 to 30 nanoseconds in duration. The short pulse length provides for good definition, i.e., enhanced ability of the system to respond to and delineate small changes in extinction coefficient along the optical path. The backscattered radiation is received and detected in optical receiver 9 and then applied to variable gain amplifier 10 whose gain is adjusted in a conventional manner to normalize the amplitude of the detected backscattered signal to a predetermined value. The normalized pulse at the output of amplifier 10 is operated upon by clipper 12 to produce an output only during the time that the amplitude of the normalized pulse is equal to or greater than one-half said predetermined value. The width of the base of the pulse which is passed by clipper 12 is to be measured.

The clipped pulse is applied to Schmitt trigger circuit 13 which generates a rectangular output pulse during the time that a clipped pulse is produced by clipper 12. The steeply sloping sides of the rectangular pulse from circuit 13 trigger pulse width time interval counter 14. Counter 14 is turned on by the leading edge and turned off by the trailing edge, respectively, of the pulse from circuit 13. During the time that counter 14 is turned on, it counts the number of pulses received from time interval oscillator 15. A signal representing the resultant count, i.e., representing the duration of the detected backscattered signal measured at half its peak amplitude, is applied via line 16 to extinction coefficient computer 17. The pulse from circuit 13 also is applied to range time interval counter 18. Counter 13 is turned on by the pulse produced by range timing photodetector 19 and turned off by the leading edge of the pulse from circuit 13. Counter 18, like counter 14, counts the number of pulses received from time interval oscillator 15 during the time that the counter is turned on. The magnitude of the count resulting from counter 18 represents the elapsed time between the emission of the laser pulse from transmitter 8 and the occurrence of the leading edge of the detected backscattered signal passed by clipper 12, i.e., the range to the region of reduced visibility whose extinction coefficient is to be determined.

Computer 17 is instrumented for the solution of the equation $$\sigma_{r_2-r_1} = \sigma_{REF} + \frac{K \ln \frac{y_1}{y_2}}{r_2 - r_1}$$

where $\sigma_{r_2-r_1}$ represents the extinction coefficient between the spacial points represented by the leading and trailing edges, respectively, of the pulse produced by circuit 13, $\sigma_{REF}$ represents an assumed reference value for extinction coefficient obtaining under good visibility conditions against which the actual existing extinction coefficient is compared, and $$\frac{K \ln \frac{y_1}{y_2}}{r_2 - r_1}$$

represents the difference in value between the reference extinction coefficient and the actual existing extinction coefficient being measured. In the term $$\frac{K \ln \frac{y_1}{y_2}}{r_2 - r_1}$$

K represents an equipment calibration constant, and $y_1$ and $y_2$ represent the ordinate values of the backscatter function corresponding to the reference extinction coefficient associated with the abscissa values $r_1$ and $r_2$, respectively. The backscatter function corresponding to the reference extinction coefficient is represented by the solid line curve 20 of FIG. 8 whereas the backscattered function corresponding to the actual existing extinction coefficient is represented by the dashed curve 21.

The simplified block diagram of FIG. 7 represents an analog instrumentation of a computer for solving the relationship $$\sigma_{r_2-r_1} = \sigma_{REF} + \frac{K \ln \frac{y_1}{y_2}}{r_2 - r_1}$$

The two input signals on lines 16 and 24 are derived from lines 16 and 24, respectively, of FIG. 4. The signal on line 16 representing the quantity $t_2-t_1$ is converted from time units into equivalent range units by fixed gain amplifier 25. Similarly, the signal on line 24 representing the time term $t_1$ is converted into its equivalent range term $r_1$ by fixed gain amplifier 26 having the same gain factor as amplifier 25. A signal representing the reciprocal of the term $r_2-r_1$ is produced by inverse function generator 27. A suitable inverse function generator is disclosed in U.S. Pat. 2,924,386 issued to James E. Brook on Feb. 9, 1960. The signal representing the reciprocal term $$\frac{1}{r_2 - r_1}$$

is amplified by fixed gain amplifier 28 to provide on line 29 a signal representing the term $$\frac{K}{r_2 - r_1}$$

Figure 8:
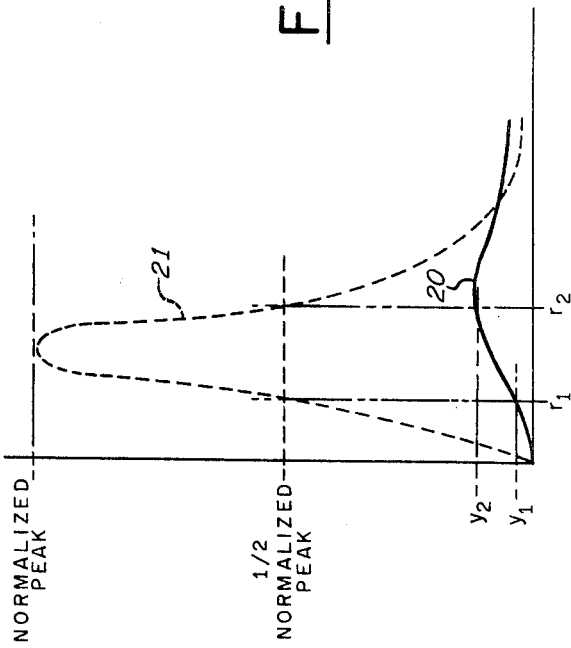
FIG. 8 is a pair of superimposed backscattered signals useful in understanding the operation of the computer of FIG. 7.

The signal representing $r_2-r_1$ also is applied to summing circuit 30 together with the signal at the output of amplifier 26 representing the term $r_1$. The linear summation of the two signals provides an output signal on line 31 representing the term $r_2$. Two identical backscatter function generators 32 and 33, each instrumenting the curve 20 of FIG. 8, are provided to develop signals on lines 34 and 35 representing the ordinate values corresponding to the respective abscissa values $r_2$ and $r_1$ of curve 20 of FIG. 8. The signal representing the term $y_2$ is applied to inverse function generator 36, to produce on line 37 a signal representing the term $1/y_2$. The signals on lines 35 and 37 are applied to signal multiplier 38 to provide an output signal representing $y_1/y_2$. The output signal, in turn, is applied to logarithmic circuit 39 to provide on line 40 a signal representing the term $\ln y_1/y_2$. The signals on lines 29 and 40 are applied to multiplier circuit 41 to yield a signal on line 42 representing the term $$\frac{K \ln \frac{y_1}{y_2}}{r_2 - r_1}$$

which is the difference between the value of the extinction coefficient being measured and the reference extinction value corresponding to the backscattered function of curve 20 of FIG. 8. A signal representing the reference extinction coefficient value is generated by source 43 and applied to summing circuit 44 together with the signal on line 42. Circuit 44 provides on output line 45 a signal representing the value of the extinction coefficient of the atmosphere between the spacing points $r_1$ and $r_2$ irradiated by the light pulse from transmitter 8 of FIG. 4.

Figure 3:
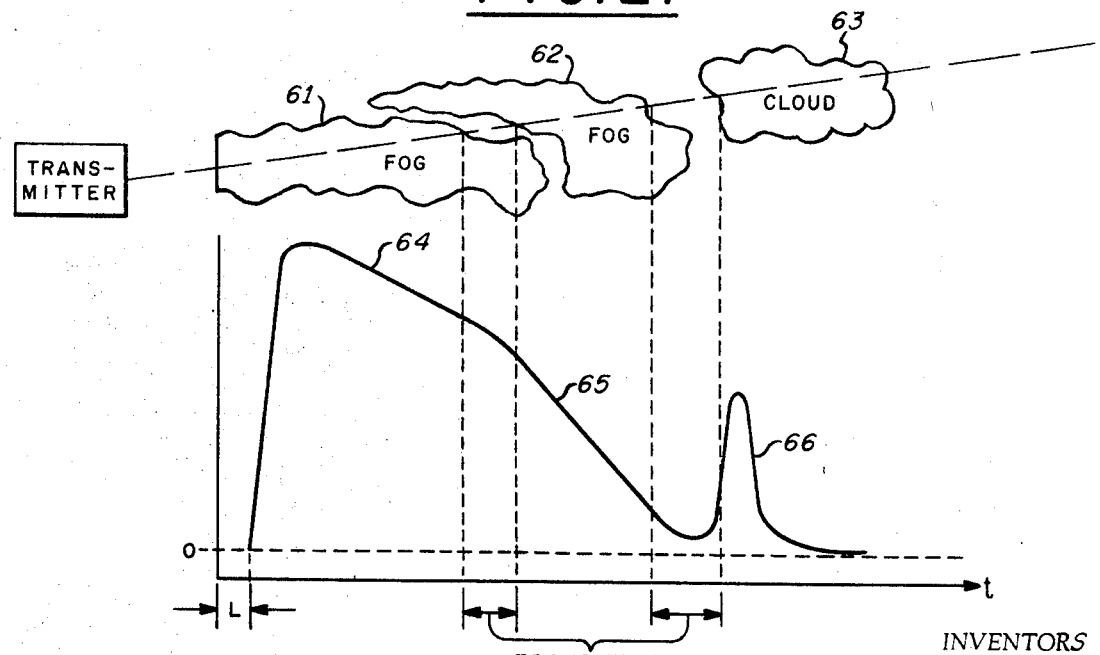
FIG. 3 is a logarithmic amplitude versus time plot of a typical backscattered signal developed in the receiver of one of the species of the present invention.

A second method for measuring the value of the extinction coefficient is provided by the apparatus of FIG. 5 which determines the slope of the received backscattered signal along a preselected region subsequent to the peak, such as along region 5 of the curve of FIG. 2. Transmitter laser 57 of FIG. 5 produces a short light pulse for the irradiation of the atmosphere whose extinction coefficient is to be measured. The backscattered radiation is received and detected in optical receiver 58, linearly amplified in amplifier 59 and then logarithmically amplified in logarithmic amplifier 60. The effect of the logarithmic operator introduced by amplifier 60 is shown in the logarithmic amplitude versus time plot of a typical backscattered signal in FIG. 3. The backscattered signal of FIG. 3 results from the assumed atmospheric condition wherein the transmitted light pulse first encounters a region of patchy fog 61, then a region of patchy fog 62 and finally the region of cloud 63. Each corresponding region along the plot of FIG. 3 is manifested by a respective waveform (not shown) such as the waveform of FIG. 2, which, when operated upon logarithmically yields the plot of FIG. 3. The approximately exponential decay in the region 5 in the waveform of FIG. 2 is converted into a corresponding linear decay of constant slope for each homogeneous volume of space having a given value of extinction coefficient. Thus, the slope of linear decay portion 64 represents the extinction coefficient of patchy fog 61. The slope of linear decay portion 65 represents the extinction coefficient of patchy fog 62 and the slope of linear decay portion 66 represents the extinction coefficient of cloud region 63. The apparatus of FIG. 5 determines the slope of any selectable one of the portions 64, 65 or 66.

Referring to FIG. 5, the signal at the output of logarithmic amplifier 60 is applied to differentiating circuit 67 which converts each linear portion 64, 65 and 66 of the signal at the output of amplifier 60 represented in the plot of FIG. 3 into a respective D.C. voltage level. That is, region 66 is converted to D.C. voltage of greatest value, region 65 is converted to D.C. voltage of intermediate value and region 64 is converted to D.C. voltage of least value, the three D.C. voltages together comprising a stepped voltage waveform which is applied by line 68 to gating circuit 69. The stepped waveform is sampled at a preselected time, relative to the occurrence of the transmitted pulse so as to determine the extinction coefficient at a desired range.

Range timing photodetector 70, like detector 19 of

FIG. 4 is located relative to transmitter 57 so as to receive a portion of the forward scattered light without interfering with the backscattered flux received by receiver 58. The voltage pulse produced by photodetector 70 is sharpened in gate pulse generator 71 and then variably delayed in variable delay circuit 72 in accordance with the setting of delay control 73. The controllably delayed pulse is applied to gating circuit 69 for sampling the stepped waveform at the output of circuit 68 at the desired time. A pulse whose amplitude represents the value of the signal on line 68 during the occurrence of the gating pulse on line 74 is applied to peak detector 75. Detector 75 provides an output signal on line 76 for application to extinction coefficient computer 77 representing the slope of the backscattered signal function at a preselected range from the transmitter.

Figure 6:
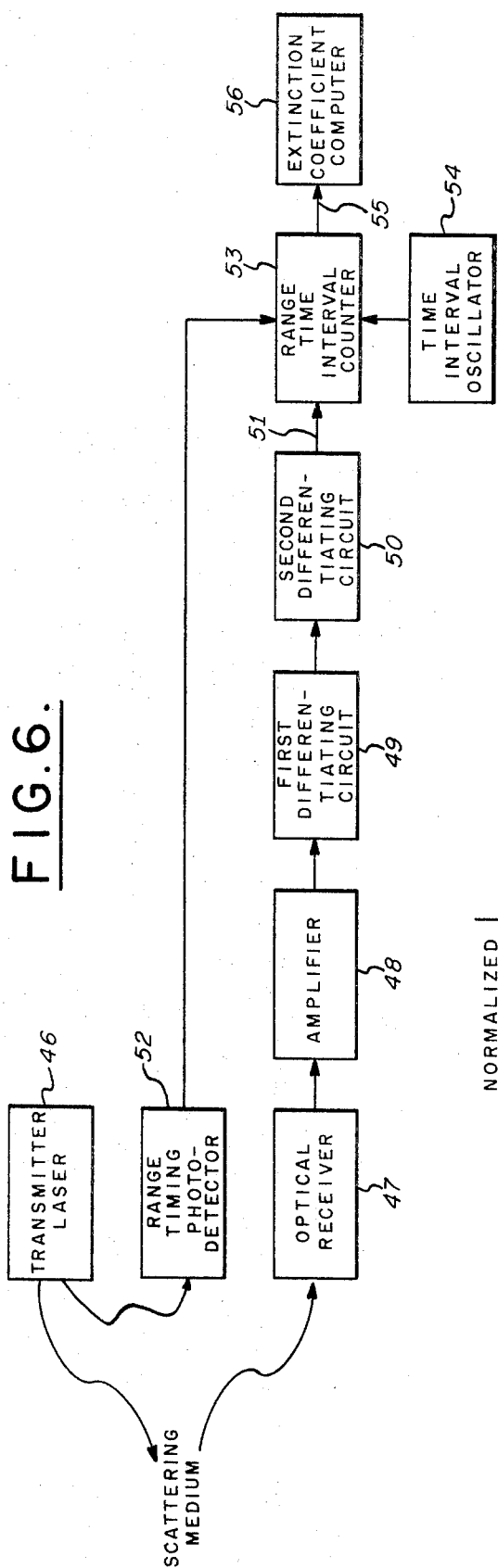
FIG. 6 is a simplified block diagram of the receiver for the pulse time species of the present invention.

A third approach to the measurement of the desired extinction coefficient is provided by the apparatus of FIG. 6. In the case of FIG. 6, the time of occurrence 7 of the peak backscattered pulse of FIG. 2 relative to the occurrence of the transmitted light pulse is determined. Transmitter laser 46 irradiates the scattering medium whose extinction coefficient is to be determined with a short pulse of energy. The back-scattered radiation is received and detected in optical receiver 47 whose output signal is first linearly amplified in amplifier 48 and then applied to first differentiating circuit 49. The signal at the output of circuit 49 is applied to second differentiating circuit 50 to provide a trigger signal on line 51 occurring when the slope of the backscattered signal changes from positive to negative, i.e., at the signal peak. The time of occurrence of the transmitted light pulse is determined by range timing photodetector 52 which is positioned relative to transmitter 46 so that it receives a portion of the forward scattered light output from transmitter 46 without interfering with the backscattered flux receiver by the receiver 47. The pulse generated by detector 52 starts the operation of the range time interval counter 53. Counter 53 is stopped by the pulse on line 51 which occurs at the peak of the backscattered signal. Counter 53 counts the number of pulses generated by oscillator 54 during the time that it is turned on and provides an output signal on line 55 representing the time of occurrence 7 of the peak of the backscattered pulse of FIG. 2 relative to the occurrence of the transmitted pulse for application to extinction coefficient computer 56.

Computer 56 is instrumented in a conventional manner for the solution of the expression $$\sigma = \frac{1}{2A(r_m)} \frac{d}{dr}[A(r_m)] - \frac{2}{r_m}$$

wherein $A(r_m)$ is the effective cross-sectional area of the pulse $l$ (FIG. 1) at the range $r_m$ of the peak of the backscattered signal, and $r_m$ represents the range to said peak (represented by the signal on line 55 of FIG. 6). Range $r_m$ is determined, of course, by ascertaining the time to the peak of the backscattered signal. Then from a knowledge of the range, the spacing between the transmitter and receiver, the transmitter beam angle and the receiver field of view the extinction coefficient can be readily calculated.

In the case of the embodiment of FIG. 5, range is determined by the setting of control 73 of circuit 72 and is represented by a signal on line 78 which is applied to computer 77. Computer 77 is instrumented in a conventional manner for the solution of the expression $$\sigma = \frac{1}{2A(r)} \frac{d}{dr}[A(r)] - \frac{1}{2y}\frac{dy}{dr} - \frac{2}{r}$$

where $A(r)$ is the effective cross-sectional area of the pulse at range $r$, $r$ is the range at which the slope of the backscattered signal function is being measured, $y$ is the ordinate value of the backscattered pulse at which the slope is measured, and $dy/dr$ is the measured slope of the backscattered signal function, the latter two factors being represented by the term $$^{1/2}\left(\frac{1}{y}\frac{dy}{dr}\right)$$

It is therefore seen that the extinction coefficient is dependent, among other factors, on the slope of the detected backscattered energy divided by the value of the ordinate at which the slope is measured. A convenient method for computing the value of the term $$\frac{1}{y}\frac{dy}{dr}$$

is to solve the well-known equivalent expression $$\left(\frac{\ln y}{dr}\right)$$

Thus, in the embodiment of FIG. 5, logarithmic amplifier 60 and differentiating circuit 67, which perform the function $$d\left(\frac{\ln y}{dr}\right)$$

also perform the function $$\frac{1}{y}\frac{dy}{dr}$$

It should be noted that the cross-sectional area terms $A(r)$ and $A(r_m)$ are representative of an area amplification, that is, referring to FIG. 1, the cross-sectional area of the detected backscattered pulse will continuously increase in amplitude as it propagates from the transmitter. This area amplification is opposed, as previously mentioned, by increasing attenuation resulting from both increasing range (range attenuation) and increasing extinction (atmospheric attenuation). In any event, the required information for determining the extinction coefficient is related in all cases to a range measurement characteristic of the detected backscattered pulse where the range characteristic is representative of the combined effects of atmospheric attenuation ($\sigma$), range attenuation (reciprocal of $r$) and area amplification $A(r)$.

It can be seen from the preceding specification that the objects of the present invention have been achieved by the provision of a single-ended atmospheric extinction coefficient measuring system which determines any one of three special characteristics of the received backscattered energy. The aforementioned three backscattered signal characteristics consist of (1) the time of the amplitude peak of the received backscattered energy relative to the time of transmission; (2) the duration of the received backscattered energy measured at the half peak amplitude point; and (3) the slope or rate of decay of the received backscattered energy. Separate determinations of the extinction coefficient can be made by respective computers which receive signals representing the three characteristics of the received backscattered energy.

What is claimed is:
1. In a single-ended system for determining atmospheric extinction coefficient, apparatus comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source, and
means coupled to said detecting means for determining the time of the amplitude peak of said detected backscattered energy relative to the time of occurrence of said pulse energy from which the extinction coefficient is determined.

2. In a single-ended system for determining atmospheric extinction coefficient, apparatus comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source,
normalizing means coupled to said detecting means for normalizing the peak amplitude of said detected backscattered energy, and
means coupled to said normalizing means for determining the duration of the normalized detected backscattered energy measured at the half amplitude point from which the extinction coefficient is determined.

3. In a single-ended system for determining atmospheric extinction coefficient, apparatus comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source, and
means coupled to said detecting means for determining the rate of change of said detected backscattered energy divided by the value of the ordinate at which said rate of change is measured from which the extinction coefficient is determined.

4. A single-ended system for determining atmospheric extinction coefficient, said system comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source,
means coupled to said detecting means for producing an output signal representing the time of the amplitude peak of said detected backscattered energy relative to the time of occurrence of said pulse energy, and
computer means coupled to receive said output signal for computing the value of the atmospheric extinction coefficient.

5. A single-ended system for determining atmospheric extinction coefficient, said system comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source,
normalizing means coupled to said detecting means for normalizing the peak amplitude of said detected backscattered energy,
means coupled to said normalizing means for producing an output signal representing the duration of the normalized detected backscattered energy measured at the half peak amplitude point, and
computer means coupled to receive said output signals for computing the value of the atmospheric extinction coefficient.

6. A single-ended system for determining atmospheric extinction coefficient, said system comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source,
means coupled to said detecting means for producing an output signal representing the rate of change of said detected backscattered energy divided by the value of the ordinate at which said rate of change is measured, and
computer means coupled to receive said output signal for computing the value of the atmospheric extinction coefficient.

7. In a single-ended system for determining atmospheric extinction coefficient, apparatus comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source, and
means coupled to said detecting means for determining the duration of said detected backscattered energy measured at the half peak amplitude point from which the extinction coefficient is determined.

8. In a single-ended system for determining atmospheric extinction coefficient, apparatus comprising
a source of a divergent beam of pulse energy for irradiating the scattering medium whose extinction coefficient is to be determined,
detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source,
logarithmic means coupled to said detecting means for producing an output signal representing the logarithm of said detected backscattered energy, and
means coupled to said logarithmic means for differentiating said output signal from which the extinction coefficient is determined.

9. In a single-ended system for determining atmospheric extinction coefficient, apparatus comprising
a source of a divergent beam of pulse energy for irradiating the scattering medium whose extinction coefficient is to be determined, detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source, logarithmic means coupled to said detecting means for producing an output signal representing the logarithm of said detected backscattered energy, means coupled to said logarithmic means for differentiating said output signal, and computer means coupled to receive the differentiated output signal for computing the value of the atmospheric extinction coefficient.

10. A single-ended system for determining atmospheric extinction coefficient, said system comprising a source of a divergent beam of pulse energy for irradiating the scattering medium whose extinction coefficient is to be determined, detecting means spaced transversely of said beam for detecting energy backscattered by said medium from said pulse energy, said detecting means having a divergent field of view and being disposed relative to said source such that the optical axes of said source and said detecting means are substantially parallel and said field of view at least partially overlaps the full length of said divergent beam beginning at a predetermined distance remote from said source, and means coupled to said detecting means for producing an output signal representing the duration of said detected backscattered energy measured at the half peak amplitude point, and computer means coupled to receive said output signal for computing the value of the atmospheric extinction coefficient.

References Cited

UNITED STATES PATENTS

| | | |
|---|---|---|
| 2,968,987 | 1/1961 | Knopow. |
| 3,146,293 | 8/1964 | Lesage. |
| 3,244,059 | 4/1966 | Simpkins. |

FOREIGN PATENTS

| | | |
|---|---|---|
| 794,472 | 5/1958 | Great Britain. |

OTHER REFERENCES

Horman: "Measurement of Atmospheric Transmissivity Using Backscattered Light From a Pulsed Light Beam," Journal of the Optical Society of America, vol. 51, No. 6, June 1961, pp. 681–691.

RONALD L. WIBERT, Primary Examiner

O. B. CHEW II, Assistant Examiner

U.S. Cl. X.R.

250—218